H. A. MARTIN.
DIFFERENTIAL MECHANISM FOR ACCOUNTING MACHINES.
APPLICATION FILED DEC. 31, 1913.

1,153,328.

Patented Sept. 14, 1915.
3 SHEETS—SHEET 1.

Witnesses
H. W. Lindsey Jr.
H. F. Sadgebury

Inventor
Haakon A. Martin
by R. Chlaer
Chester H. Braselton
Attorneys

H. A. MARTIN.
DIFFERENTIAL MECHANISM FOR ACCOUNTING MACHINES.
APPLICATION FILED DEC. 31, 1913.

1,153,328.

Patented Sept. 14, 1915.
3 SHEETS—SHEET 2.

Witnesses
H. W. Lindsey Jr.
H. F. Sadgebury

Inventor
Haakon A. Martin
by R. C. Mars
Chester H. Braselton
Attorneys

H. A. MARTIN.
DIFFERENTIAL MECHANISM FOR ACCOUNTING MACHINES.
APPLICATION FILED DEC. 31, 1913.

1,153,328.

Patented Sept. 14, 1915.

Witnesses
H. W. Lindsey Jr.
H. F. Sadgebury

Inventor
Haakon A. Martin
by R. C. Mass.
Chester H. Braselton
Attorneys

UNITED STATES PATENT OFFICE.

HAAKON A. MARTIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

DIFFERENTIAL MECHANISM FOR ACCOUNTING-MACHINES.

1,153,328.   Specification of Letters Patent.   Patented Sept. 14, 1915.

Application filed December 31, 1913. Serial No. 809,709.

*To all whom it may concern:*

Be it known that I, HAAKON A. MARTIN, a citizen of the United States, residing at Dayton, in the county of Montgomery and State of Ohio, have invented certain new and useful Improvements in Differential Mechanism for Accounting-Machines, of which I declare the following to be a full, clear, and exact description.

This invention relates to accounting machines and more particularly to the arrangement of two groups of keys in one bank, each group being arranged to perform different functions.

It was the principal object of this invention to provide an improved arrangement of two differential mechanisms, so that each differential mechanism will be controlled by a corresponding group of two groups of keys which comprise a single bank. In the preferred form of embodiment disclosed herein, both of the differential mechanisms controlled by the two groups of keys in the one bank are driven from the same shaft and each carries latching mechanism adapted to coöperate only with the keys of its appropriate group.

The particular form of machine to which the present improvements have been applied is that shown and described in Letters Patent of the United States issued April 13, 1897, to J. P. Cleal and F. A. Reinhart and numbered 580,378. In the illustrative form shown herein, a group of amount keys is arranged in a single bank with special keys controlling a special indicator which may be used to indicate either the particular clerks operating the machine, or the different classes of transactions involved in the business. The bank of keys is arranged in a single key frame such as that shown in the above mentioned patent, and differential mechanism, controlled by the special keys, is arranged on one side of an upright frame supporting the key frame, while the differential mechanism, controlled by the amount keys is on the other side of this upright frame.

Although in the preferred form shown herein, special keys control a special indicator and the amount keys control amount differential mechanism, it will be apparent that the amount keys as well as the special keys may be employed to perform special functions by having the differential mechanism controlled thereby perform other functions than controlling the extent of movement of the amount differential mechanism. For example, the differential mechanism for either the amount or the special keys shown may be designed to control a clerk's indicator, predetermine a drawer to be opened in a multiple drawer machine, such as shown in Letters Patent of the United States No. 616,866, granted to W. F. Bockhoff, select any one of a plurality of clerks' totalizers, for actuation, as shown in the present applicant's application Serial No. 593,202 filed November 19, 1910, control a special indicator for indicating the classes of transactions, or select any one of a plurality of transaction totalizers for actuation, as shown in the above mentioned application.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings.

Figures 3, 6:
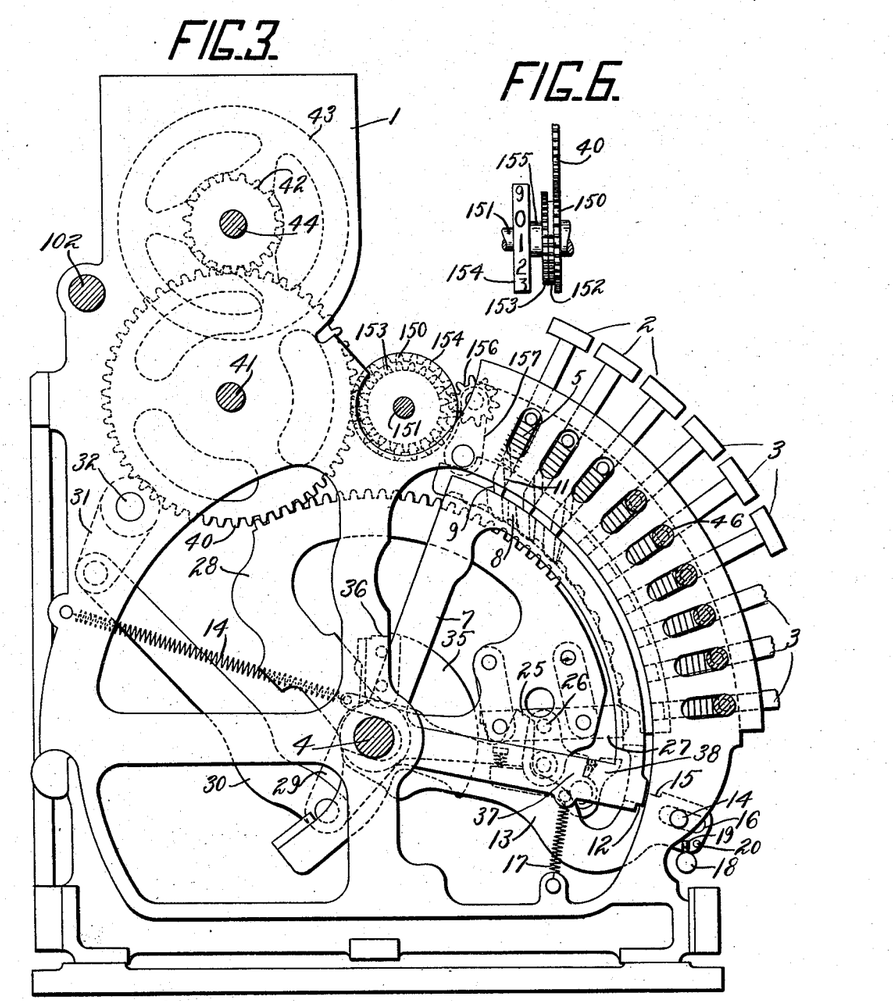
Fig. 3 is a transverse vertical section through the machine taken just to the left of the supporting frame 1, shown in Fig. 1, and showing the differential mechanism controlled by the amount keys in the divided bank and the locking detent for these keys.
Fig. 6 is a front detail view of the totalizer element controlled by the amount keys in the divided bank and shows the gears mounted on the totalizer shaft with this totalizer wheel.
Figure 4:
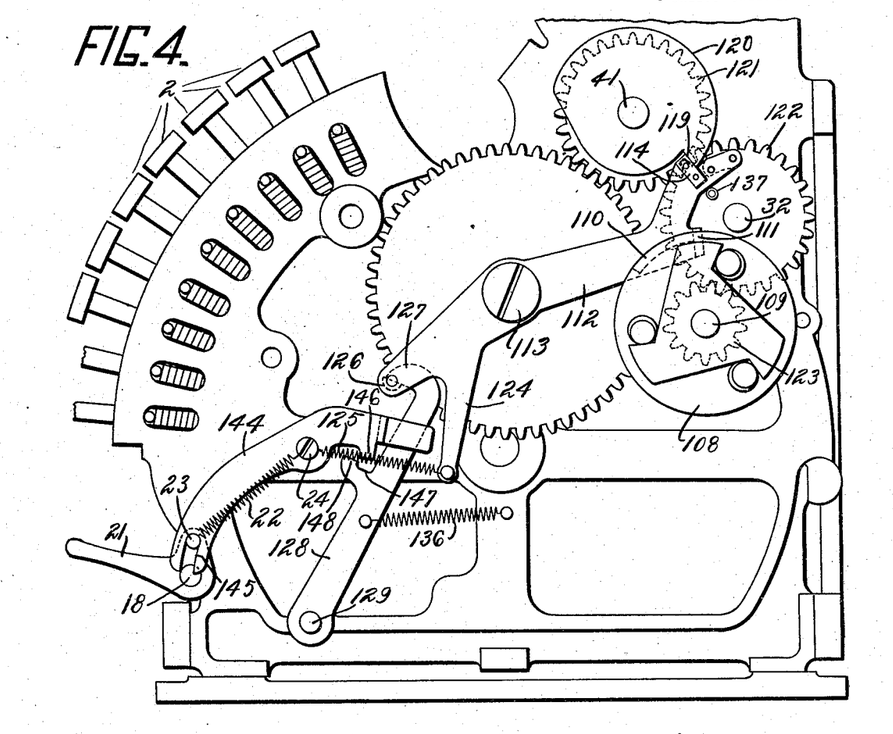
Fig. 4 is a right hand side elevation of the machine with the upper part of the side frame partly broken away and showing locking means for the motor driven operating mechanism. The totalizing mechanism is omitted in this figure.

The machine proper is provided with a plurality of banks of amount keys 2 and each of the banks of the amount keys of the lower denomination comprise nine keys, as shown in Fig. 4, and these keys as usual are numbered from 1 to 9 beginning at the bottom of the bank. The bank of keys, shown in Figs. 1 and 3, includes three amount keys 2, which are the three upper keys of the bank, and six special keys 3, which are the lower keys in the bank. These three amount keys are described herein as being the "1" "2" and "3" keys of greatest denomination. This bank of keys is arranged at the left side of the machine, and as this bank comprises these two groups of keys it will be called herein the "divided bank." The keys in this divided bank as well as the keys in the remaining banks of keys are carried in key frames which are concentric with a central shaft 4. Ways are cut in each frame to permit the keys to be pressed in radially toward the shaft 4, against the tension of their springs 5. These springs as usual are coiled about the shanks of the keys and serve to normally retain the keys in undepressed position and to restore them to this position at the end of the operation of the machine.

*Amount keys detent mechanism.*—The amount keys of the divided bank, as well as the keys of the remaining banks, are provided with means for locking them in depressed position, and as this means is old in the art, it will be but briefly described here. The locking mechanism for the amount keys of the divided bank is shown in Fig. 3 of the drawings. This locking mechanism includes a locking member or detent 7 pivoted on the central shaft 4 of the machine, and its free end forms an arc concentric with the arc in which the keys are placed. The curved forward end of the detent 7 is provided on its one side with laterally projecting lugs 8, one of which is provided for each amount key in the bank. When any one of the amount keys is depressed against the tension of its spring 5, the inner beveled end 9 of the key engages the lug 8 and causes the detent to rock upward about its pivot. In this position the lug 8 immediately adjacent and below the one which was engaged by the key will have entered the slot 11 formed in the depressed key, and retain the key in depressed position. When the locking members 7 is in normal position, the lower forward end 12 rests, as shown in Fig. 3, in engagement with a notch formed in the upper edge of a plate 13, which is mounted to slide upon the central rock shaft 4 of the machine and a pin 14 projecting from the frame 1 of the machine and passing through the slot 16 in the plate. When an amount key is depressed, the member 7 is rocked upward in the manner just described to an extent sufficient to clear the notch in the member 13 and the spring 14 draws the plate 13 rearwardly until the shoulder 15 on the plate 13 passes beneath the forward end 12 of the member 7, thus holding the member in moved position during an operation of the machine. Near the end of the operation of the machine, the plate 13 is given a forward movement and the member 7 is lowered by its spring 17 to release the operated amount key, in the manner well known in the art.

It is customary in machines of the present type to provide means whereby, when an amount key is depressed in error, the same may be released before an operation of the machine is begun. This means comprises a shaft 18 extending longitudinally across the front of the machine, and bearing pins 19 (Fig. 3) each of which is normally out of engagement with a corresponding pin 20 on the forward end of the sliding plate 13. The shaft 18, as shown in Fig. 4 has fast to its right hand end a small operating lever 21. A spring 22, connecting a pin 23 on the lever 21 and a stationary screw 24, normally holds the lever 21 and shaft 18 in the position shown in the drawings. When it is desired to release any amount key, which is depressed in error, it is necessary merely to press down on the forward end of the lever 21, thereby rocking the shaft 18 to cause the pins 19 carried thereby to engage the pins 20 on the plates 13. This movement of the shaft will draw the plate 13 for each bank forwardly a sufficient extent to withdraw the locking shoulders 15 from beneath the dentent members 7 thereby permitting the latter to be lowered to release the depressed amount keys.

*Amount differential mechanism.*—The differential mechanism for the amount keys in the divided bank is in substance the same as that provided for the amount keys in the other banks. This differential mechanism for the amount keys of the divided bank is shown in Fig. 3 and being well known in the art will be but briefly described here. Upon rearward movement of the sliding plate 13. an upward extension 25 thereof will be withdrawn from a pin 26 projecting from a latching bar 27 which is suitably mounted upon a toothed segment 28 which, in turn, is loosely mounted upon the central rock shaft 4. This latter shaft has fast thereto a downwardly and rearwardly extending arm 29 connected by a link 30 to an arm 31, which is rigidly mounted upon the main drive shaft 32. This shaft 32 is given a complete rotation once during each operation of the machine, and through the arm 31 link 30, and arm 29 rocks the shaft 4 first in a clockwise direction then in the reverse direction slightly past its normal position and then back in a clockwise direction to normal position.

Secured to the rock shaft 4 are driving plates or segments 35, one for each bank of amount keys, and each of these plates is provided with a shoulder 36 with which the latch bar 27 engages when the shoulder is brought opposite the rear end of the latch bar upon downward movement of the plate 35, so that when the plate 35 is returned to normal position it will carry along with it the latch bar 27 and as the latter, is mounted upon segment 28, the plate 35 will also carry along with it the segment 28. Pivotally mounted upon each segment 28 below the latch bar 27 is an arm 37 which carries a spring pressed pawl 38. As the segment 28 is rotated rearwardly, that is counter clockwise (Fig. 3) by the above described means, the pawl 38 will engage the depressed amount key and rock the arm 37 about its pivotal point causing the arm in turn to rock the latch bar 27 out of engagement with the shoulder 36 of the plate 35, so that the plate may continue its movement independently of the segment gear 28.

The segment gear 28 controlled by the amount keys 2 engages with an intermediate gear 40, which is loosely mounted upon the transverse shaft 41 immediately to the right of the frame 1 and the gear 40 in turn meshes with the pinion 42 secured to an indicator wheel 43, which carries the three amounts represented by the three amount keys of this bank, and displays the amount corresponding to the value of the key depressed. The gear wheel 40, controlled by the amount keys of the divided bank also meshes with a pinion 150 (Figs. 3 and 6) which is loosely mounted on a totalizer shaft 151. Rigid with the pinion 150 but of smaller diameter is a pinion 152 having but six teeth. A pinion 153 which is of the same diameter as the pinion 152 and has twenty teeth, is loosely mounted beside the pinion 152. The totalizer wheel 154 is rigidly connected to the pinion 153 by a sleeve 155 surrounding the shaft 151. Before the upward return movement of the driving plates 35 is begun, a coupling pinion 156, which is sufficiently broad to engage both of the pinions 152 and 153, is thrown into mesh with the teeth of the pinion 153. The six teeth on the pinion 152 are so arranged that the pinion must have imparted thereto the first six steps of movement of the segment gear 28 from zero position through the medium of the gear 40, before its teeth will engage the broad pinion. If the "1" key, in the divided bank is depressed the segment gear 28 will receive seven steps of movement from its zero position before the pawl 38 engages the depressed key and the seventh step of movement, through the gear 40, pinions 150 and 152, broad pinion 150 and pinion 153, will be transmitted to the totalizer wheel 154 to add one thereon. In a similar manner the totalizer will receive two or three steps of movement if the "2" or "3" keys respectively are depressed. It is to be understood that the differential movement of the segments 28 for the amount banks of keys of lower denominations is transmitted to the corresponding totalizer wheels in a similar manner, only the pinions 152 for these banks of keys have as many teeth as the pinion 153 so that the totalizer wheels may be moved from one to nine steps dependent upon the keys depressed. Each of the coupling pinions 156 is mounted on a corresponding arm 157 which is rocked to engage and disengage the companion pinions 152 and 153 at the proper time, in the manner fully described in the above mentioned patent granted to Cleal and Reinhart.

*Special key detent mechanism.*—The special keys 3, as shown in Fig. 3, are not as long as the amount keys so that, when the special keys are depressed, their inner ends do not project into the path of movement of the pawl 38. The right side of the forward end of the detent 7 below the amount keys, and in the plane of the lugs 8, is cut away so that the special keys may be depressed without effecting in any way the locking mechanism or differential mechanism for the amount keys. Pins 45 which project from the left hand side of the special keys 3 beyond the left hand side of the frame 1, are provided with rollers 46 which are not quite as long as the pins 45. The pins on the amount keys 2 of the divided bank do not project beyond the left hand side of the frame 1. The pins 45 on the special keys, at their free ends and beyond the rollers 46, pass into the slots 47 cut in the forward edge of a plate 48, which is rigidly mounted on the screws 49 projecting from the left side of the frame 1. This movement of the pins 45 in the slots 47 is provided to prevent the pins from being twisted or bent when the keys are depressed.

A locking detent 50 (Fig. 2) which is concentric with the central rock shaft 4 is provided at its upper and lower ends with oppositely extending notches 51, which straddle the screws 49 in such a manner as to permit movement of the detent on the pins. When a special key is depressed, it can be seen that the roller 46, carried on its pin 45, will engage the inclined edge 52 of the slot 53 in the path of the roller on the key and will raise the detent until the roller has passed off of the inclined edge 52. Then a spring 54, connecting an extension 55 on the lower end of the detent with a stud 56 on the frame of the machine will draw the detent downward so that the setoff 57 in the notch 53 will pass over the roller and hold the key in depressed position. If a key has been depressed in error, the correct key may be depressed to raise the detent 50 as before and as the setoff 57 is carried away from the roller 46 on the first depressed key its spring 5 returns it to initial position and the correct key is then held in depressed position. A roller 58, to which the spring 54 is fastened, normally engages the beveled edge 59 on the upper edge of a sliding plate 60, which is constructed similarly to the sliding plate 13 for the amount keys and is adapted to be guided in its movements by the central shaft 4 and the pin 14 which also projects to the left of the frame 1. Near its rear end, the plate 60 carries an anti-friction roller 62, which plays in a slot 63 in a driving plate 64 fast to the central shaft 4. The upper portion of the slot is concentric with the central shaft 4 so that when the shaft is rocked in a clockwise direction the roller 62 idly plays in this portion of the slot. Near the end of the operation of the machine, however, the shaft, and therefore the plate 64 is rocked in a reverse direction past the normal position shown in Fig. 1 and, as the lower portion of the slot is eccentric with the shaft 4, the plate 60 is given a movement toward the front of the machine causing the beveled edge 59 of the plate, through its engagement with the roller 58, to force the detent 50 upward. This upward movement of the detent carries the corresponding setoff 57 in the notch 53 away from the roller 46 on the depressed key, to permit the spring 5 for the key to return the key to undepressed position. Finally the plate 64 is again rocked in a clockwise direction to the normal position shown, to permit a spring 66 connecting the plate 60 with a stationary part of the machine, to draw the plate 60 rearwardly again and thereby permit the detent 50 to be lowered to normal position by its spring 54.

*Differential mechanism controlled by special keys.*—Loosely mounted upon the left hand end of the central shaft 4 is a plate 67 having a segmental rack portion 68 engaging with an intermediate gear 69. This gear 69 constantly meshes with a pinion 70 rigid with the special indicator wheel 71 loosely mounted on the shaft 44 and serving to present an indication corresponding to the adjustment of the segmental gear 68 which is accomplished by the following mechanism: A right angled lever 72 is loosely mounted at 73 to a forwardly extending projection 74 of the plate 67. Pivoted to the lever 72 at 75 is a link 76, which at its lower or inner end carries a roller 77 playing in a slot 78 formed in the plate 67. A spring 79 is under tension between a stud 80 on the plate 67 and a pin 81 projecting from the link 76. The spring 79 operates in a slot 82 formed in the plate 67. The lever 72 is provided with an arm 84 extending inwardly from the pivot 73 and a laterally extending flange 85 on the arm 84 normally engages the edge 86 of a latch pawl 87 loosely mounted at 73 on the plate 67. A spring 83, under tension between the arm 84 and a hooked projection 89 on the pawl 87, normally maintains this engagement of the flange 85 with the edge 86. The latch pawl 87 is equipped with a notch 90 the projection forming the lower wall of which is longer than the projection forming the upper wall of it. When a special key is depressed and the machine operated the plate 64 is rocked downward an invariable extent with the shaft 4, the plate being rigid with the latter, and a notch 91 is the periphery of the moving plate is carried beneath the roller 77 on the link 76. When the notch 91 is brought into this position the spring 79 pulls the link 76 toward the central shaft 4, until the roller 77 rests in the notch 91. The projection 92 above the notch 91 projects beyond the periphery of the plate 64 below the notch to prevent the notch 91 from passing below the roller 77 and thereby not allowing the spring 79 to pull the link 76 inward to engage the notch with the roller 77 which might readily happen on a sudden operation of the machine. To further insure the passage of the roller 77 into the notch 91, whenever the latter is beneath the former the outwardly extending portion 94 of the lever 72 is so designed, that if the projection 92 on the plate engages the roller 77 and the spring 79 fails to seat the roller in the notch, the portion 94 will engage the pin 45 on the depressed key whenever it reaches the latter in the clockwise movement of the segment gear 68 and rock the lever 72 counter clockwise about its pivotal point to force the roller 77 into the notch 91. If the roller is properly seated in the notch by the spring 79 the projection 94 of the lever 72 will merely pass below the pin 45 on the depressed key without engaging it. As the plate 67 is not rocked downward far enough to permit the pin 45 on the bottom key to be engaged by the lever 72 when this key is depressed, a pin 95 on the plate 48 is provided for this purpose.

Figure 5:
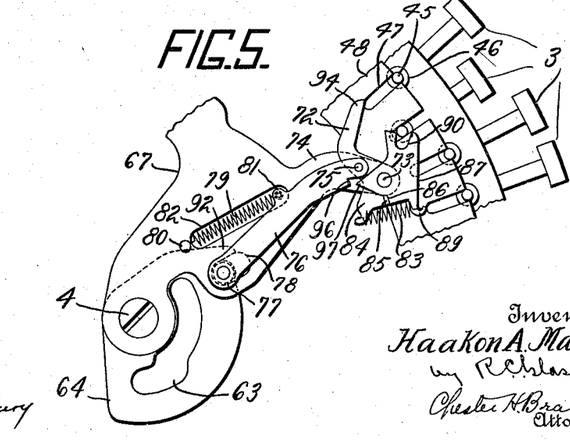
Fig. 5 is a detail view of the latching device carried by the differential mechanism for the special keys, and shows this latching device in the position in which it is after passing the fifth special key from the bottom, which is shown in the depressed position.

As shown in Fig. 5, after the link 76 has been drawn inwardly, a notch 96 on the lower forward end of the link is carried out of engagement with a pointed projection 97 of the latch pawl 87, and the latch pawl is rocked about its pivotal point, by the lever 72 as the flange 85 on the lever engages the edge 86 of the pawl as mentioned above. As the plate 64 carries the plate 67 downward the latch pawl 87 engages the pin 45 on the depressed key and the pawl is rocked counter clockwise about its pivot tensioning the spring 83 and as the pawl passes out of engagement with the pin 45 the spring 83 rocks it back into the position shown in Fig. 5. On the return stroke of the plates 64 and 67 the lower wall of the notch 90 in the pawl 87 engages the pin 45 on the depressed key and rocks the pawl 87 and therefore the lever 72 about their common pivotal center 73 and in this manner draws the link 76 forward, to carry the rollers 77 on it out of engagement with the notch 91 in the plate 64. As the pawl 87 is so rocked about its pivot the pointed projection 97 of the pawl engages the notch 96 in the link and holds the pawl rigid with the link and in this manner prevents the pawl from moving in either a clockwise or counter clockwise direction which might permit it becoming disengaged from the pin 45 on the depressed key, if the machine was rapidly operated.

It can be seen from the above description that upon operation of the machine, if a special key has been depressed, the plate 67 will be connected to the driving plate 64 and carried downward and upon the return stroke of the plate 64 the depressed key will operate the latch 87 which will thus permit the plate 64 to continue its upper movement independently of the plate 67. This differential movement of the plate 67 through the toothed portion 68 and the intermediate gear 69 will rotate the indicator 71 to display a character corresponding to that on the key depressed. The intermediate gear 69 carries a notched alining plate 100 and the notches in the plate are adapted to be engaged by the beveled nose of an alining pawl 101. The alining pawl 101 is fast to a rock shaft 102 which also carries a downwardly extending arm 103. A roller 104 carried at the lower end of this arm 103 is normally engaged with the curved periphery of the open cam 105 to hold the alining pawl in alining position with the notched plate 100, while the machine is not in operation. The open cam 105 is fast to the rotation shaft 32 and the cam is so arranged on the shaft that, at the beginning of the operation of the machine it is carried out of engagement with the roller 104 to permit the adjustment of the indicator wheel 71 and near the end of the operation of the machine the cam 105 again engages the roller 104 to rock the pawl 101 into alining engagement with the plate 100.

*Motor controlling mechanism.*—It is desirable that machines of this type be provided with electric motor operating mechanism, in order to dispense with the hand operated crank, which was formerly employed. The motor mechanism which it is desired to use in connection with the present machine is of a form which is old and well-known in the art and shown in Letters Patent of United States to C. F. Kettering, No. 910,690 issued January 26, 1909, and reference may be had to this patent for a detail description of the motor mechanism. By referring to this patent, it will be found that the motor is not positively connected to the main drive shaft of the register, but that a clutch connection is interposed between the two which clutch connection in the present invention is controlled by the special keys.

The motor mechanism and the direct control of the special keys over the clutch connections are shown in the present application, to show the arrangement of this mechanism with relation to the special keys which now form, as described above, a group of keys of the divided bank. Mechanism is also provided whereby a second operation of the machine is prevented when one of the controlling keys is held in at the end of a previous operation. It has been found that in practice this is often attempted by persons, who attempt to misoperate the machine to cover up operations in which the proper amounts are not entered in the machine. In these attempts it is customary to push in one of the controlling keys and hold it in depressed position at the end of the first operation thereby keeping the circuit for the motor closed and permitting an immediate second operation of the machine to destroy the indication of the first operation. This would prevent the reading of the false indication by the customer or other persons in the store. With the construction shown in Fig. 1 it is rendered necessary to permit a complete release of the operated controlling key and its restoration to normal position before a second operation of the machine may be effected.

In the drawings, only a portion of the clutch is shown (Fig. 4). This form of clutch has become well-known in the art, and it is not thought necessary to describe it in detail in the present application. In the form of clutch shown in the Kettering patent above mentioned, a clutch member 108 is adapted to be given a slight preliminary movement in a clockwise direction as viewed in Fig. 4, about a shaft or stud 109 under the action of a coiled spring (not shown), to render the clutch effective. The clutch member 108, however, is normally restrained from such movement by the engagement of a flange 110, carried by the member 108, with a flange 111, formed on a rearwardly extending arm of a lever 112, which is pivoted at 113 to the right hand frame of the machine. The lever 112 on its rearwardly extending arm also carries a lug 114, which normally engages a shoulder 119 formed on a disk 120 fast on the shaft 41. As will be noted from the train of gearing, comprising the gear wheels 121, 122 and 123, the shaft 41 and the main drive shaft 32, carrying the gear wheel 122, are adapted to be given a single rotation at each operation of the machine. Connected to a downwardly extending arm 124 of the lever 112 is a spring 125 which normally tends to rock the lever 112 about its pivot 113 to withdraw the lug 114 from engagement with the shoulder 119 of the disk 121 and also withdraw the flange 111 from the path of the flange 110 carried by the clutched disk 108 and thereby render the clutch effective, release the motor, and permit the operation of the machine. The movement of the lever 112 in this manner is prevented, however, by reason of the engagement of a lug 126 carried at the forward end of the lever 112 with the lower face of a projection 127 of an arm 128 fast to a rock shaft 129 which extends longitudinally across the bottom of the machine. Fast on the rock shaft 129 and near the left hand side of the machine (Fig. 1) is an arm 130, and the rear edge of this arm normally engages a flange 131 projecting laterally from an arm 132 forming part of a sliding plate 133. This sliding plate 133 at its upper and lower ends is provided with notches similar to the notches 51 in the plate 50 (Fig. 2) and these notches straddle the pins 49 extending to the left of the detent 50 to permit movement of the plate 133. This plate 133 is also provided with notches 134 there being one notch for each of the special keys 3. When one of the special keys is depressed its roller 46 engages the inclined upper face of its notch 134 and raises the plate 133 to bring the flange 131 on the plate opposite a cut 135 in the upper rear edge of the arm 130. When the lug 131 is brought in this position, a spring 136 (Fig. 4) connecting the arm 128 to the frame of the machine draws the arms 128 and 130 rearward. The projection 127 on the arm 128 is in this manner carried away from the lug 126 on the lever 112 and the spring 125 immediately acts to rock the lever 112 about its pivot 113 thereby releasing the operating mechanism as hereinbefore described. Upon operation of the machine, after the shafts 32 and 41 have been given nearly one rotation, a pin 137 carried by the gear wheel 122 engages the rearward end of the lever 112 thereby rocking the lever 112 about its pivot 113 against the tension of its spring 125 back to normal locking position. When the sliding plate 60 is moved forwardly near the end of the operation of the machine, as described, a pin 138 engages the arm 130 and in this way rocks the arm 130 forwardly. This movement of the arm 130 rocks the shaft 129 to also carry the arm 128 forwardly and bring the projection 127 into locking engagement with the lug 126, thereby locking the lever 112 against movement until the next operation of the machine.

Figures 1, 2:
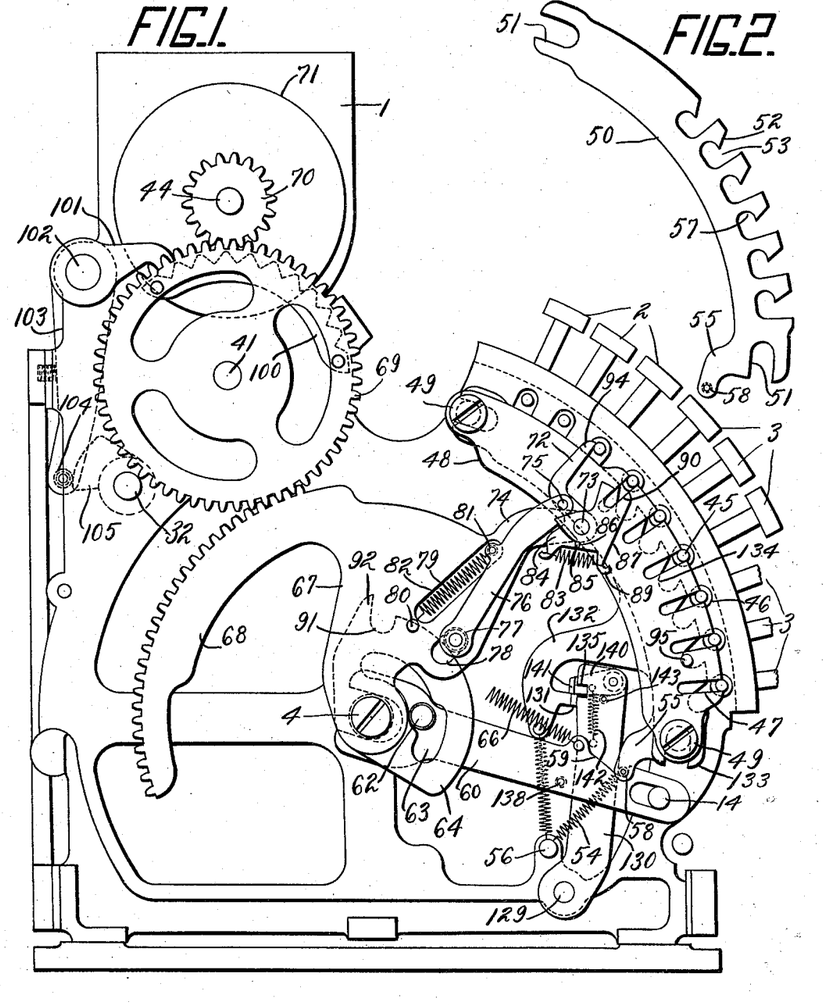
Figure 1 is a right hand side elevation of the type of machine, shown in the above mentioned patent granted to Cleal and Reinhart, with the present invention applied thereto, and showing the differential mechanism, controlled by the special keys, and omitting the totalizing mechanism.
Fig. 2 is a detail view showing the locking detent for the special keys.

As shown in Fig. 1 the arm 130 has pivotally mounted at its upper end an arm 140 which at its free end carries a flange 141 normally engaging the upper edge of the flanged projection 131 on the arm 132 of the plate 133. A spring 142, connecting the arm 140 with the arm 130, tends to pull the arm 140 downward and a pin 143 on the arm 130 prevents the spring from pulling the arm 140 down past normal position. It is apparent that when a special key is depressed and the plate 133 raised, the arm 140 will be rocked upward and when the arm 130 is rocked inwardly the flange 141 of the arm 140 merely slides on the upper edge of the flange projection 131. When the arm 130 however, is rocked forwardly near the end of the operation of the machine, as above described, the flange 141 is carried forwardly an extent sufficient to slide out of engagement with the flange projection 131 and then falls over the cut 135 in the arm 130. If the key is held in depressed position at the end of the operation of the machine, the arm 130 and the arm 128 can not be rocked slightly forward again to the normal position shown in the drawings as the vertical rear face of the flange 141 abuts against the projection 131 of the plate 133. When the key is released, however, the plate 133 is lowered and, as the flange projection 131 passes out of engagement with the vertical face of the flange 141, the spring 125 draws the arms 130 and 128 backward to normal position. It can be seen in Fig. 4 that the lower face of the projection 127 on the arm 128 is sufficiently long to permit the arm 128 to rock forward past its normal position as just described.

From the above description it is obvious that when a special key is retained in depressed position at the end of the operation of the machine, the arms 130 and 128 are prevented from rocking rearward by the presence of the flange 141 on the arm 140 over the cut 135 in the arm 130, which through the projection 127 on the arm 128 not being carried away from the lug 126 on the lever 112 serves to prevent a second operation of the machine.

A lever 144 (Fig. 4) is loosely pivoted at 24 and at its forward end is provided with a slot 145 which straddles the pin 23 on the handle 21 employed to release the depressed amount keys before the machine is operated as described. When the handle 21 is depressed the lever 144 is rocked and a projection 146 on the lever passes into a notch 147 on the arm 128 to prevent movement of the arm and thereby the releasing of the machine by the special keys. While the machine is in operation the projection 148 on the arm 128 is under the projection 144 on the lever 145 so that movement of the lever 144 at such time is prevented and hence the handle 21 cannot, during operation of the machine, be moved to release the amount keys.

It is thought that the above description is sufficient for a complete understanding of the invention and a detail description of its operation will not be given. Briefly, it may be stated, that the machine is provided with a divided bank and that one key in each group of keys comprising the bank can be depressed at the same operation of the machine. Each group of keys in the bank is provided with locking means and each group of keys controls its individual differential mechanism, the differential mechanism of each group being entirely independent of each other. It can be further seen that the special keys in the bank control the machine releasing means as is usual in the art.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

I claim:

1. In a machine of the class described, the combination with a bank of keys, comprising two groups of keys; of independent locking means for each group of keys whereby one key in each group of the bank of keys may be depressed and locked in depressed position at one operation of the machine; a main drive shaft; and independent differential mechanism for each group of keys each driven from the main drive shaft, the keys in each group in the bank being designed to predetermine the extent of movement of its corresponding differential mechanism.

2. In a machine of the class described, the combination with a main drive shaft; of an upright frame; a key frame mounted thereon and curved in form; two groups of keys carried in said key frame; and independent differential mechanism for the groups of keys loosely mounted on said shaft at both sides of said frame and driven from said shaft, the extent of movement of each differential mechanism being predetermined by its corresponding group of keys at the same operation of the machine.

3. In a machine of the class described, the combination with a bank of keys, comprising two groups of keys; independent locking means for each group of keys so designed that any key in each group of the bank of keys may be depressed and locked in depressed position at one operation; a main drive shaft; independent differential mechanism for each group of keys each driven by the main drive shaft but normally disconnected therefrom; and latch mechanism for each differential mechanism for connecting each differential mechanism independent of the other to the main drive shaft, each group of keys being constructed to control its corresponding latch mechanism and thereby determine the extent of movement of its corresponding differential mechanism.

4. In a machine of the class described, the combination with a bank of keys, comprising two groups of keys; of independent locking means for each group of keys whereby one key in each group of the bank of keys may be depressed and locked in depressed position at one operation of the machine; a main drive shaft; independent differential mechanism for each bank of keys and driven from the main drive shaft, the keys in each group in the bank being designed to predetermine the extent of movement of its corresponding differential mechanism; a locking arm normally locking said shaft from movement; a spring normally tending to move said arm out of locking position; a member normally preventing movement of said arm; and a plate moved by one group of keys in said bank but not by the other group to prevent movement of said member and thereby allow said spring to move said locking arm out of locking position.

5. In a machine of the class described, the combination with a main operating mechanism; of a spring operated locking arm normally locking said mechanism from movement; a spring operated device for normally preventing movement of said locking arm and having a notch; a plate bearing a projection normally out of operative relation with the notch in said device; keys for moving said plate to bring said projection into operative relation with the notch in said device whereupon said device is moved to permit movement of said locking arm out of locking position; means for restoring said arm to locking position; an arm pivoted on said device and having a flange normally passing over said notch in said device and movable out of such position upon depression of one of said keys by engagement with a side of the projection on said plate; and means for moving said device past normal position so that the flange on said pivoted arm passes out of engagement with the projection on said plate and over said notch whereby said flange will abut the end of said projection when said device is moved in reverse direction to normal position and prevent a second movement of the locking arm out of locking position if the depressed key is held in such position at the end of the operation.

6. In a machine of the class described, the combination with a key bank comprising two independent groups of keys; of two independent differential mechanisms, one for each group of keys; driving means for the differential mechanisms; and latching mechanisms, one for each differential mechanism for latching each differential mechanism with the driving means and adapted to engage depressed keys in their respective groups of the bank of keys whereby the corresponding differential mechanisms are disconnected from the driving means.

7. In a machine of the class described, the combination with a key bank, comprising two independent groups of keys; of two independent differential mechanisms; a rock shaft loosely carrying said differential mechanisms; two segment plates one for each differential mechanism and rigidly mounted on said shaft; and latching mechanisms one for each differential mechanism for latching each differential mechanism to said segment plates, and adapted to engage depressed keys in their respective groups of the bank of keys whereby the corresponding differential mechanisms are disconnected from their segment plates.

8. In a machine of the class described, the combination with a bank of keys, comprising two groups of keys; of pins carried by one group of keys; a key frame for carrying the bank of keys; two independent differential mechanisms, one for each group of keys in the bank; driving means for the differential mechanisms; latching devices one for each differential mechanism for connecting the corresponding differential mechanisms to the driving means, one of said latching devices being adapted to engage the inner ends of the depressed keys of one group of keys while the other latching device is adapted to engage said pins on the depressed keys of the other group of keys in the bank, to disconnect the differential mechanisms from the driving means.

9. In a machine of the class described, the combination with a differentially movable plate; of an oscillatory driving segment for said plate and having a constant extent of movement and a notch in its periphery; a lever pivoted to said differentially movable plate; a link pivoted at one end to said lever; a roller carried by said link and adapted to engage said notch in the driving segment; a spring connecting said link and said differentially movable plate for moving said link when the notch in the plate is opposite the roller; a pawl carried by said differentially movable plate; a plurality of keys; and pins on said keys adapted, when the keys are depressed, to be engaged by said lever when the differentially movable plate is moved in one direction whereby the link is positively moved to insure engagement of said roller in said notch in the driving segment, and adapted to be engaged by said pawl when the plate is moved in the opposite direction to move said link whereby said roller is carried out of said notch in the driving segment.

10. In a machine of the class described, the combination with a differentially movable plate; of an oscillatory driving segment therefor; an element pivoted on said differentially movable plate; a latch bar having a notch and pivoted to said element and adapted to connect said differentially movable plate and said driving segment; means for moving said latch bar for this purpose; a pawl carried by said differentially movable plate and provided with a projection and a notch; a plurality of depressible keys; and pins on said keys for engaging said notch in said pawl, whereby the pawl is rocked to move said latch bar out of connecting position and the projection of the pawl engages the notch in said link to positively prevent excess movement of said differentially movable plate.

11. In a machine of the class described, the combination with a key bank comprising two independent groups of keys; of two independent differential mechanisms, one for each group of keys; driving means for the differential mechanisms; and latching mechanisms one for each differential mechanism for latching each differential mechanism with the driving means and adapted to be controlled by the depressed keys in their respective groups of the bank of keys whereby the corresponding differential mechanisms are disconnected from the driving means.

In testimony whereof I affix my signature in the presence of two witnesses.

HAAKON A. MARTIN.

Witnesses:
CARL BEUST,
J. B. RICKETTS.

Copies of this patent may be obtained for five cents each, by addressing the "Commissioner of Patents, Washington, D. C."